4 Sheets—Sheet 1.
J. L. HARDEMAN.
Harvesting Machine.
No. 1,486.
Reissued May 26, 1863.
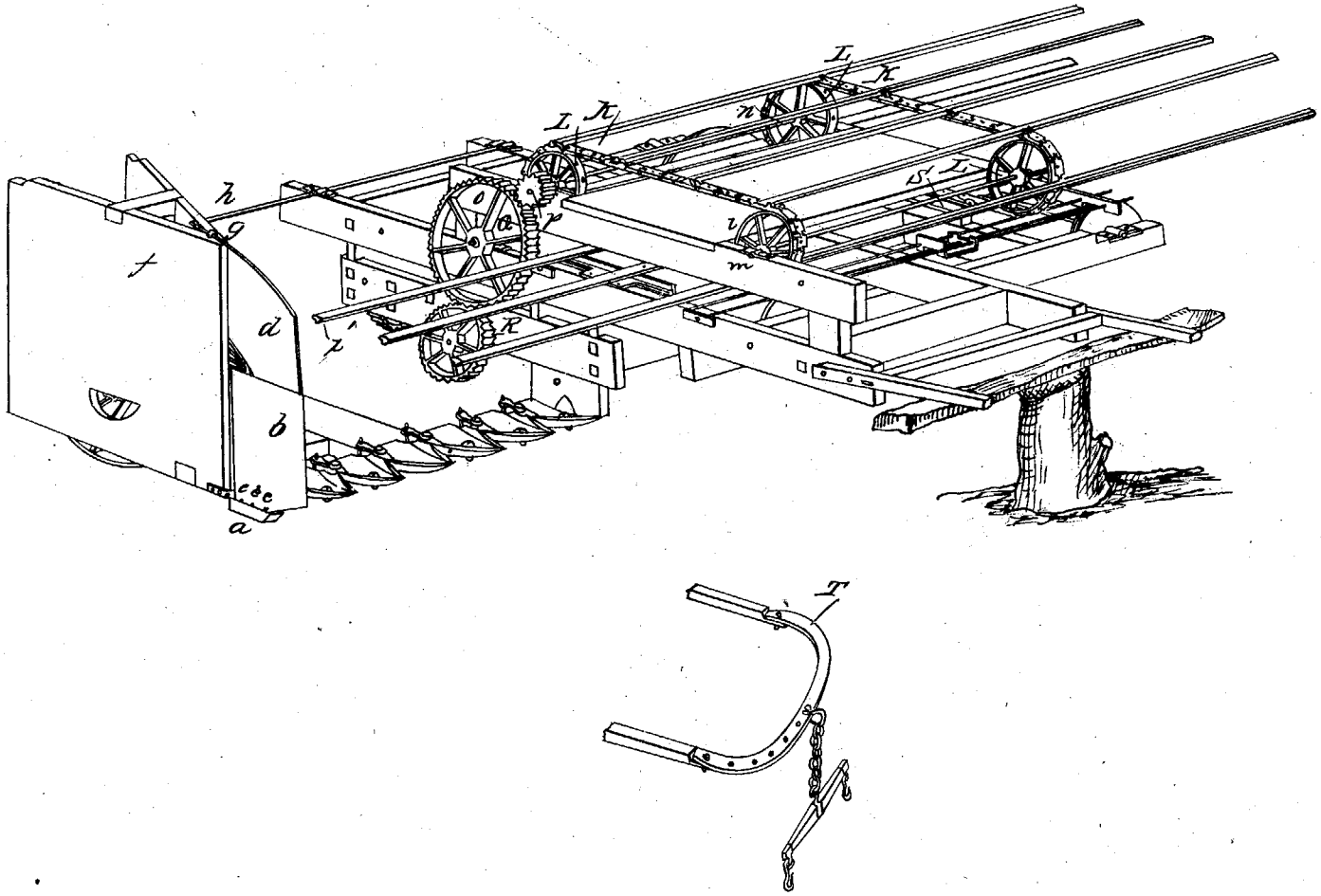
N. PETERS, Photo-Lithographer, Washington, D. C.

J. L. HARDEMAN.
Harvesting Machine.
No. 1,486. Reissued May 26, 1863.
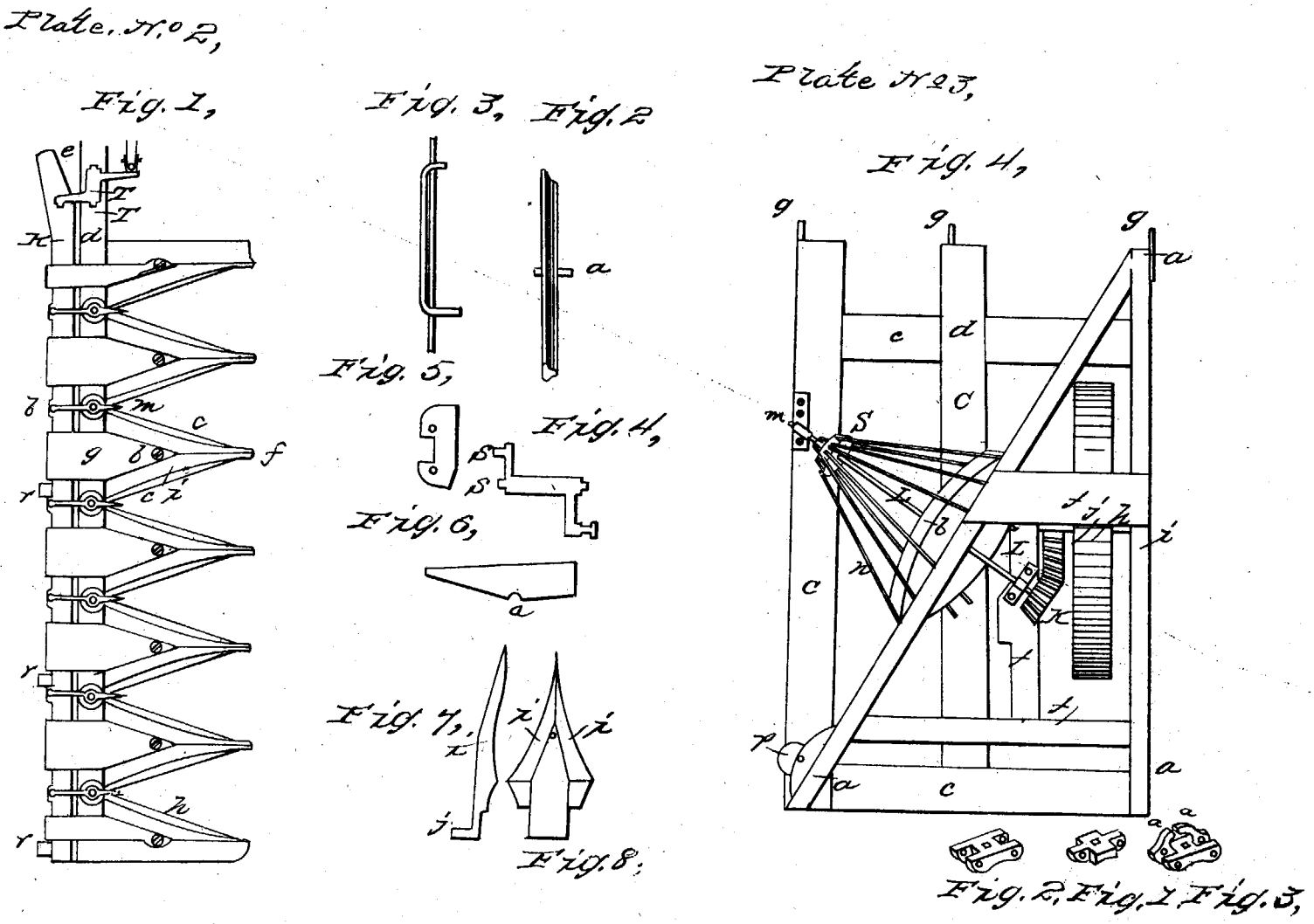
N. PETERS, Photo-Lithographer, Washington, D. C.

4 Sheets—Sheet 3.
J. L. HARDEMAN.
Harvesting Machine.
No. 1,486. Reissued May 26, 1863.
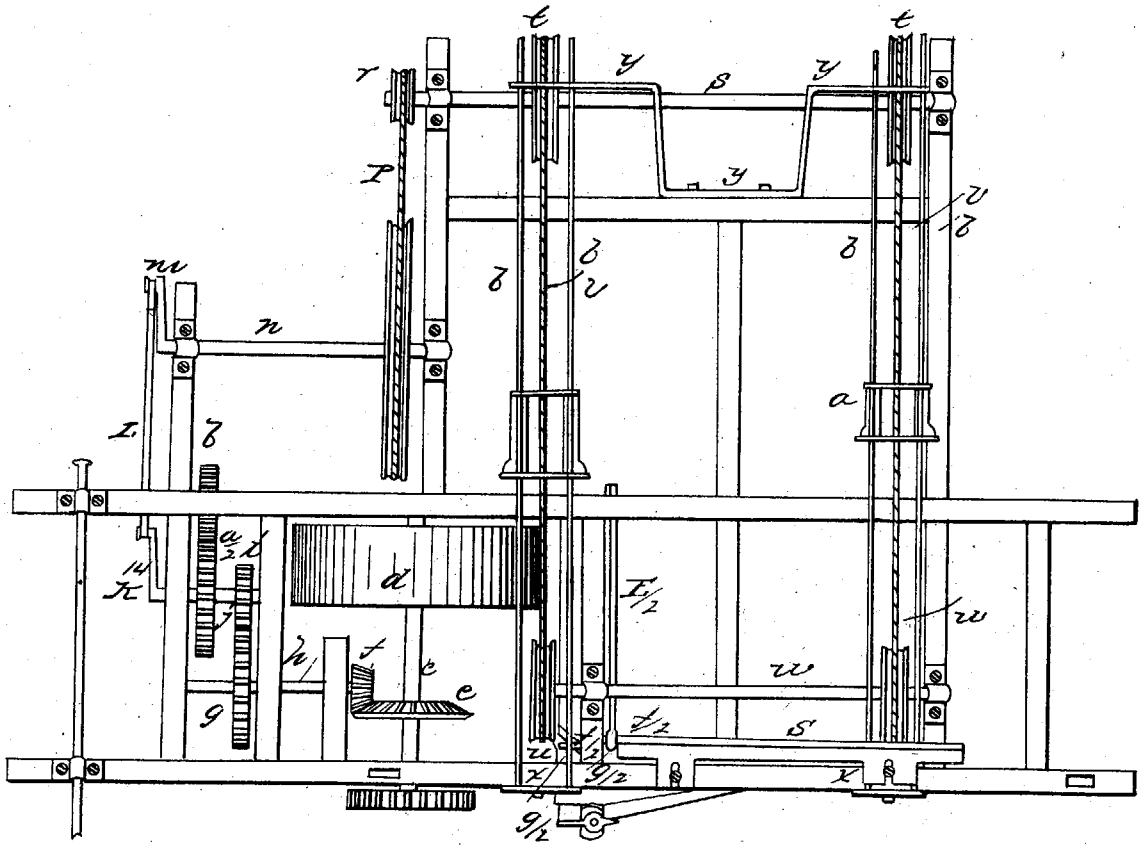
Plate, No. 4.
N. PETERS. Photo-Lithographer, Washington, D. C.

4 Sheets—Sheet 4.
J. L. HARDEMAN.
Harvesting Machine.
No. 1,486.
Reissued May 26, 1863.
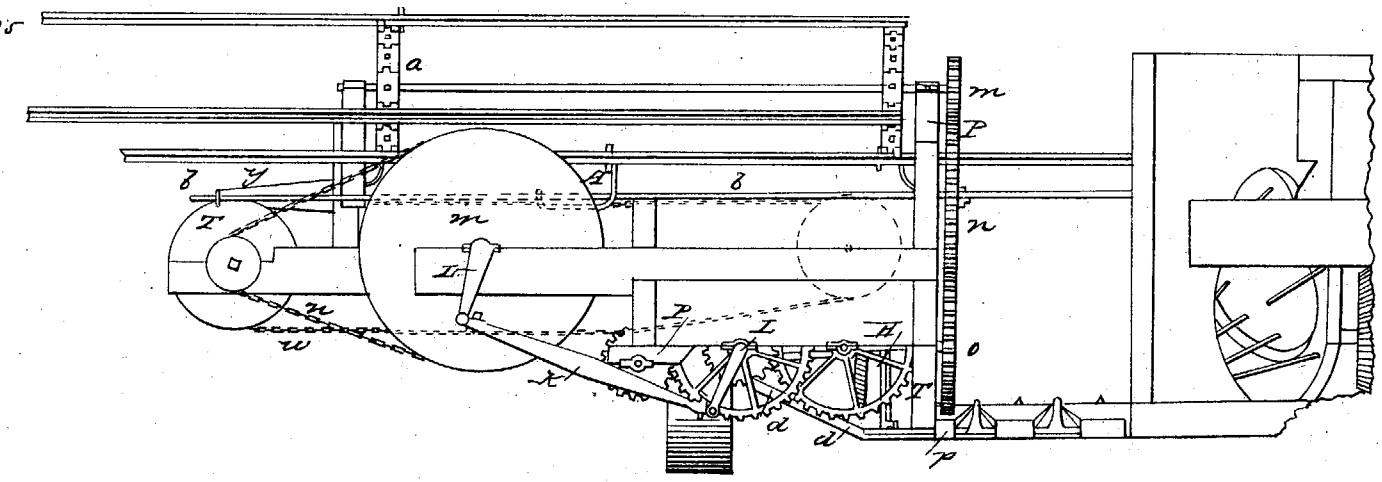
Plate No. 5.
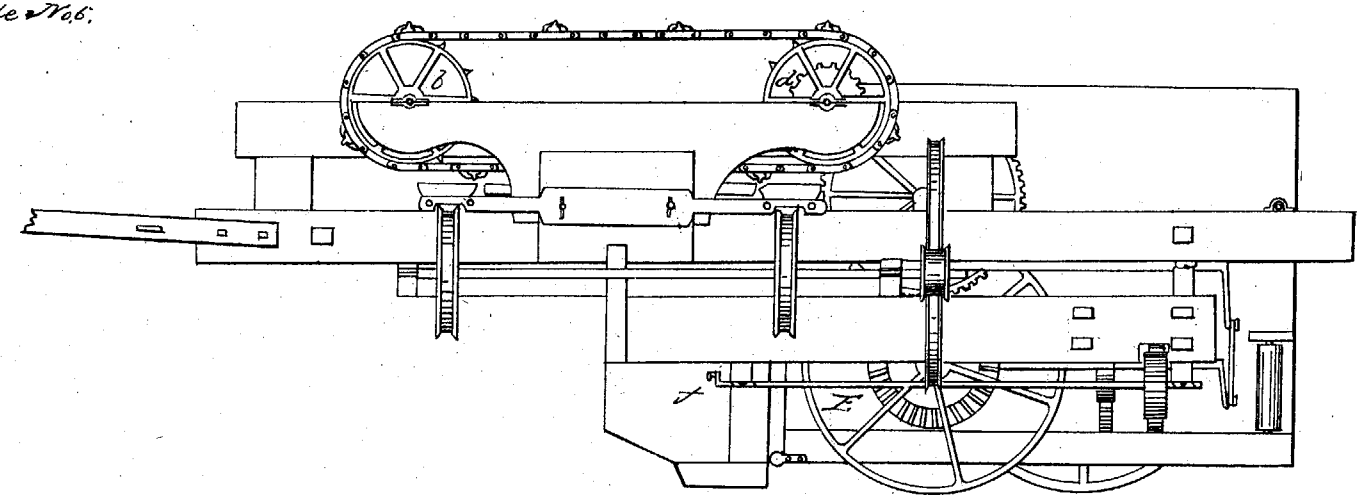
Plate No. 6.
N. PETERS, Photo-Lithographer, Washington, D. C.

UNITED STATES PATENT OFFICE.

WILLIAM N. WHITELEY, OF SPRINGFIELD, OHIO, ASSIGNEE, BY MESNE ASSIGNMENTS, OF JOHN LOCKE HARDEMAN, DECEASED.

IMPROVEMENT IN HARVESTING-MACHINES.

Specification forming part of Letters Patent No. 7,578, dated August 20, 1850; Reissue No. 1,202, dated June 18, 1861; Reissue No. 1,486, dated May 26, 1863.

DIVISION C.

*To all whom it may concern:*

Be it known that JOHN LOCKE HARDEMAN, of near Arrow Rock, Saline county, and State of Missouri, invented a new mode of constructing the rack or reel of harvesting-machines for pressing the hemp, millet, other grain, &c., back against the cutters, of which the following is a full, clear, and exact description of the same, reference being had to the accompanying drawings, forming a part of this specification, by plates, figures, and letters.

The rack or reel is intended to sustain the hemp or other material while being cut, and until the motion of the machine forward shall have given the butt-ends of the hemp or other material a sufficient inclination forward to insure its falling back upon the sustaining-rod *h* or receiver.

Two endless chains, *a*, Plates 5 and 6, are made of thirty-six links of cast-iron, each three inches in length, between rivets three inches wide and one inch thick. Of these one-half are represented by Figure 1, Plate 3; one fourth by Fig. 2, Plate 3, each having a square mortise in the center to fit the points on the wheels *b* and *d*, Plate 6. The remaining fourth are represented by Fig. 3, Plate 3, and are similar to those represented by Fig. 2, Plate 3, with the addition of spines *a a*, Plate 3, Fig. 3, on the outer surface of the link, through which the swords *b*, Plate 5, and *i*, Plate 1, pass, making one sword for every four links, or nine swords in all. These swords, a section of which is represented by Fig. 2, Plate 2, are formed of steel, eight feet long and one and a half inch wide, and ribbed like a bayonet to secure the requisite amount of strength. A cross-pin, *a*, Plate 2, Fig. 2, projects from the center one inch on each side, by which it is moved backward and forward, worked by the pallets *a a*, Plate 4, and A, Plate 5.

Figs. 3 and 5, Plate 2, represent a side and end view of the pallets, each of which runs upon two rods, *b b b b*, Plates 4 and 5. The endless chains *k k*, Plate 1, are worked by four wheels, L L L L, Plate 1, each having twelve points on the circumference working into the mortises in the links of the chains. The two forward wheels, *m*, Plate 1, are hung on a shaft four feet four inches long and one and a quarter inch in diameter; the hindmost wheels, *n*, Plate 1, on a shaft one and a half inch in diameter, four feet seven inches long, and projecting over the frame-work *o o o o o*, Plate 1, far enough to receive the pinion P, Plate 1, six inches in diameter, eighteen cogs, driven by an auxiliary wheel or pinion, Q, Plate 1, fifty-four cogs, which is driven by a wheel, R, Plate 1, twelve inches in diameter, thirty-six cogs, placed upon the main shaft C, Plate 4, of the machine.

The cutter-driving wheel *d*, Plate 4, two feet in diameter and ten inches wide, is of cast-iron, (as all the wheels are,) and supports the machine's main frame upon shaft C, Plate 4, two feet three inches long, two and a half inches square, on which is a bevel-wheel, *e*, Plate 4, one foot in diameter, thirty-six cogs, matching into a pinion, *f*, Plate 4, twelve cogs. Its shaft *h*, Plate 4, is one foot ten inches long, with a wheel, *g*, Plate 4, upon it one foot in diameter, thirty-six cogs, matching into a pinion, *i*, Plate 4, of eighteen cogs, hung upon a shaft, *j*, Plate 4, one foot long, one and a quarter inch square, having a crank, *k*, Plate 4, and I, Plate 5, five inches long on the outer end, which works a pitman, L, Plate 4, and *k*, Plate 5, two feet long, attached to one and working another crank *m*, Plate 4, and L, Plate 5, seven and a half inches long. The shaft *n*, Plate 4, of this crank is three feet five inches long, one and a quarter inch square, and has upon it a light wooden wheel, *o*, Plate 4, and *m*, Plate 5, thirty-two inches in diameter, driven by a cord, P, Plate 4, a small pulley, *r*, Plate 4, and *g*, Plate 5, three inches in diameter. The shaft S, Plate 4, is four feet five inches long, one and a quarter inch square, has upon it, besides the small-pulley *r*, Plate 4, two wooden wheels, *t t*, Plates 4 and 5, eleven inches in diameter, with cords *n n*, Plates 4 and 5, passing from these wheels over two similar wheels, *v v*, Plate 4, upon a shaft, W, Plate 4, three feet four inches long, and connecting with pallets *a a*, Plate 4, and A, Plate 5. Just above these wheels *t t* and *v v*, Plate 4, and on each side, are parallel rods *b b b b*, Plates 4 and 5, three-eighths of an inch in diameter, upon which the pallets slide. These rods are sustained on the right, *x x*, Plate 4, by the frame-timbers, and on the left by an iron support, *y y y*, Plates 4 and 5.

Now, the manner of operating the rack or reel is as follows, viz: It will be seen the driving-wheel *d*, Plate 4, puts in motion two sets of gearing—first, the revolving rack or reel, imparting to it a motion just equal to the progress of the machine forward; consequently the lower sides of the chains are stationary with regard to the ground or standing hemp, &c.; secondly, the wheels, cranks, &c., which work the pallets, giving to them a back-and-forth motion, which is obtained by the unequal lengths of the cranks employed, and the pallets are used alternately in thrusting in and withdrawing the swords from the hemp, &c., as seen in Plate 1, two of the swords being at all times in the hemp, &c., while the others are carried forward over the wheels to the point where they are introduced into the hemp, &c. Guide-rails, S S, Plate 1, are placed under the swords to insure the working of the pallets. The frame-work is of solid oak timber two inches thick, and joined as in the plates, which are on a scale of two inches to the foot, except Plate 4, which is one and a third inch to the foot.

By means of that part of the invention of the aforesaid JOHN LOCKE HARDEMAN, deceased, which is included in this division, side-cutting harvesters have been made to operate upon different principles, and to accomplish different results from any heretofore known.

It will be seen from the drawings and the description herein given that the outer ends of the swords or gathering-arms have no connection from one to that next in front or rear of it, or with the outer end of the machine's cutting apparatus when pressing the standing crop toward it, and also that the swords or gathering-arms of the revolving rack or reel move nearly in a horizontal plane outward from the main frame and rearward toward the cutting apparatus when pressing the standing crop toward it.

The advantages gained by the improvements herein described and claimed will readily be understood, by those familiar with the use of harvesters, from the drawings, description, and claims.

What I claim as new, and desire to secure by this patent as the invention of the said JOHN LOCKE HARDEMAN, is—

1. A rack or reel the outer end of whose swords or gathering-arms has no connection either with the outer end of that next in front or rear of it or with the outer end of the cutting apparatus when pressing the standing crop toward it, in combination with a side-cutting harvester having moving cutters, each of which cuts from and toward the main frame of the machine.

2. A rack or reel whose swords or gathering-arms move nearly in a horizontal plane outward from the main frame of the machine, and rearward toward its cutting apparatus when pressing the standing crop toward it, in combination with a side-cutting harvester having moving cutters, each of which cuts from and toward the main frame of the machine.

3. The combination, on a side-cutting harvester, of a rack or reel having no connection at its outer end with the outer end of the cutting apparatus, with a platform or receiving-frame immediately in rear of the finger-bar, upon which the crop falls as it is cut, and from which it is discharged, heads foremost, backward and sidewise from the cutting apparatus, and removed from the standing crop, so as to permit the passage of the team while cutting the succeeding round.

In witness whereof I have hereunto subscribed my name.

WM. N. WHITELEY.

In presence of—
GEO. H. BENNS,
JEROME FASSLER.